UNITED STATES PATENT OFFICE.

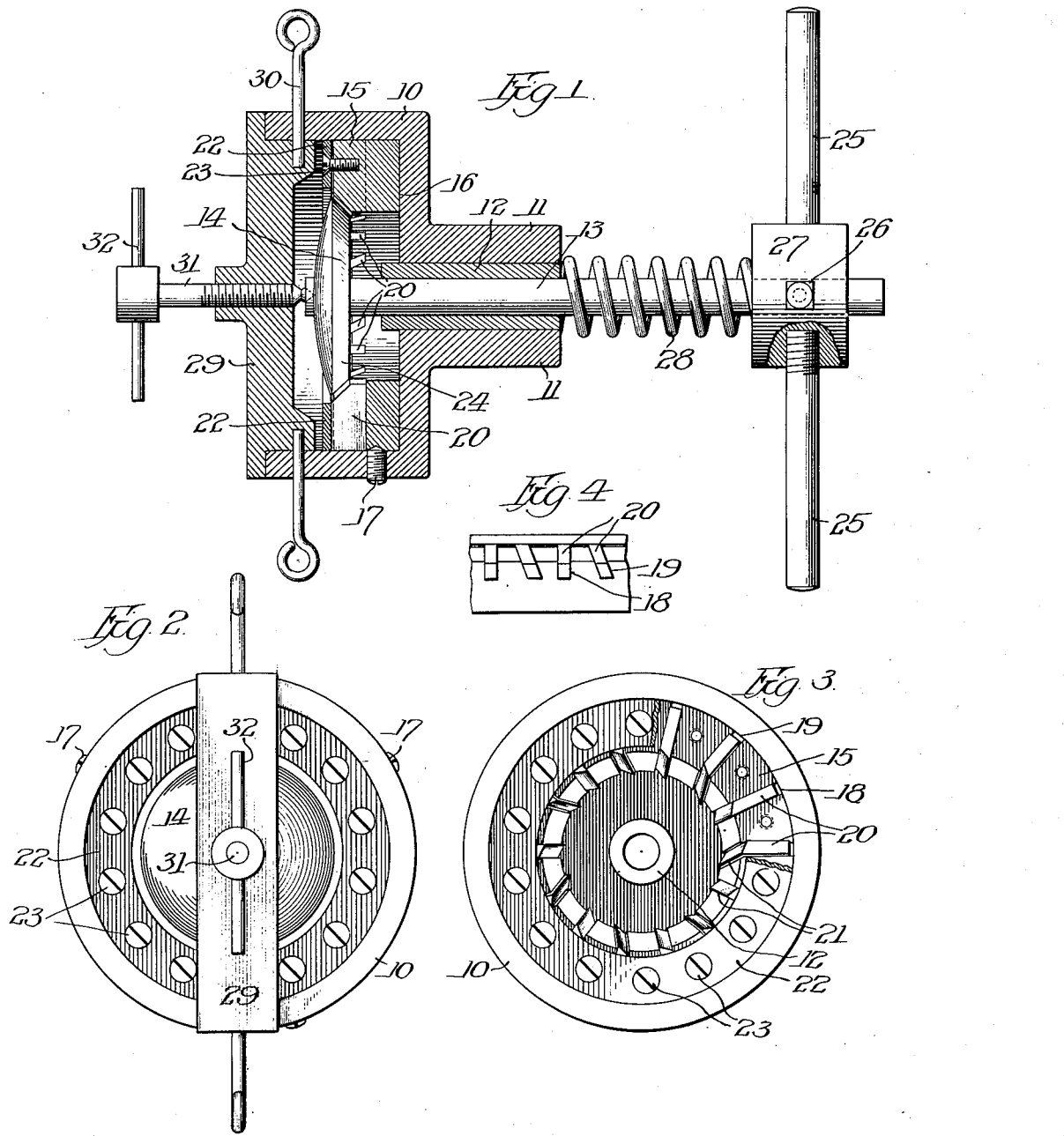

REINHOLD GESSWEIN, OF CHICAGO, ILLINOIS.

FACING-TOOL.

1,124,885.  Specification of Letters Patent.  Patented Jan. 12, 1915.

Application filed August 26, 1912. Serial No. 717,007.

*To all whom it may concern:*

Be it known that I, REINHOLD GESSWEIN, a citizen of the United States, residing at Chicago, in the county of Cook and State of Illinois, have invented certain new and useful Improvements in Facing-Tools, of which the following is a specification.

My invention relates to facing tools, and refers particularly, although not exclusively, to a tool employed for the purpose of facing valves and the seats which are to be engaged by such valves.

It is the object of my invention to provide a tool which is simple in construction while at the same time efficient in operation.

A further object consists in making the tool of comparatively small size so that it may be readily carried in an automobile or the like.

A still further object consists in so constructing the tool that it is manually operable so that valves and their seats may be faced without the necessity of using power-operated machines.

Stated in general terms, the tool which forms the subject-matter of my invention is constructed as a casing containing cutting means adapted to face the valve. This casing is provided with an aperture in which the valve stem is placed so that the valve is maintained in proper alinement to perform the facing operation. The valve may be rotated by attachment of a suitable handle thereto, and it is maintained in contact with the cutting means at the desired pressure by means of a spring or other suitable device.

While my tool may be readily employed for facing any suitable object, it is particularly useful for facing automobile valves and their seats. The tool is sufficiently small so that it may readily be carried in the tool box of an automobile, and at the same time is so simple and efficient that the labor of a skilled machinist is not required in order to perform the facing operations.

These and other advantages of my invention will be more readily understood by reference to the accompanying drawings, in which—

Figure 1 is a longitudinal section through that portion of my tool which is used for facing the valve; Fig. 2 is an end elevation of the parts shown in Fig. 1; Fig. 3 is a view similar to Fig. 2, but showing the valve and its retaining means removed so that the construction of the cutting means is more clearly apparent; Fig. 4 is a fragmentary side elevation of a portion of the cutter holding means.

The valve facing portion of my tool comprises a casing 10, having the extension 11 containing the bushing 12. This bushing has an aperture of sufficient size to receive the valve stem 13 of the valve 14 which is to be faced. Any suitable cutting means may be employed to face the valve 14, but I prefer to use a frame 15 which rests on the surface 16 of the casing 10, and which is of such size that it fits snugly within the casing. The frame 15 is held in position by the set screw 17. As most clearly shown in Fig. 3, the frame 15 is provided with a number of slots, one series of alternate slots being designated as 18 and the second series of alternate slots being designated as 19. Contained in the slots 18 and 19 are the cutter knives 20, each of which is provided with a cutting edge 21. As clearly shown in Fig. 3, the cutter knives within the slots 18 have their edges 21 in the plane of the radii extending from the center of the aperture through the bushing 12, whereas the edges of the cutter knives in the slots 19 are tilted somewhat from the plane of such radii. The cutter knives 20 are held in position by means of the ring 22 fastened to the frame 15 by means of screws 23. When the valve 14 is placed in position, as indicated in Fig. 1, its surface 24, which is adapted to engage the valve seat, will be brought into engagement with the edges of the cutter knives 20 and the valve may be rotated and thereby faced in a manner presently to be described The handle 25 may be attached to the valve stem 13 by means of the set screw 26 which passes through the block 27. A spring 28 engages the block 27 on one end and the extension 11 on its opposite end. The spring 28 tends to draw the surface 24 of the valve 14 into engagement with the edges of the cutter knives 20. The pressure of the valve on the cutter knives may be regulated by varying the position of the block 27 on the valve stem 13, thereby correspondingly varying the tension on the spring 28.

If desired, an auxiliary tension regulator may also be used in connection with my improved tool. This regulator consists of a bar 29 adapted to fit within the casing 10, and is held in position by means of the removable pins 30. The screw 31 having a handle 32 passes through a threaded aperture in the bar 29 and engages the center of the valve 14. It will be evident that the pressure between the cutter knives 20 and the valve surface 24 may be regulated by turning the screw 31. It will be observed that this screw 31 serves the further purpose of preventing lateral movement of the valve by centering the end of the stem. This feature is of special importance since, by such centering, inequality of adjustment of the cutter blades is prevented from injuring the true form of the valve.

Having thus described the construction of the tool which I use, its operation may now be readily understood.

When it is desired to face a valve and its valve seat, the valve, such as 14, is removed from the cylinder or other mechanism in connection with which it may operate, and is placed within the casing 10, the valve stem 13 projecting through the aperture in the bushing 12 and fitting snugly therein. After the spring 28 and the block 27 have been placed on the valve stem 13, the valve is manually rotated by means of the handle 25, so that the cutter knives 20 face the surface 24 of the valve. The valve is retained in proper alinement by means of the engagement of the valve stem 13 with the bushing 12, and the proper pressure is always maintained between the valve and the cutter knives by means of the spring 28. The cutter knives within the slots 18 serve to remove most of the metal, while the cutter knives within the slots 19 scrape over the surface 24 and serve as smoothing means for the latter. If it is desired to maintain the pressure between the valve 14 and the cutter knives by means of the pressure regulator previously described, the rod 29 is placed in position and the screw 31 is adjusted as desired. After the valve has been faced, the various parts are removed from the casing 10 and the valve is withdrawn from the latter. When it is desired to sharpen the cutter knives 20, the set screw 17 is loosened and the frame 15 may readily be removed from the casing 10.

It will be apparent to those skilled in the art that many changes could be made in the detailed construction of the tool which I have described without departing from the spirit or scope of my invention as set forth in the claims annexed.

What I claim is:

1. A facing tool comprising a casing having an alining aperture therein, said casing adapted to receive a valve and a valve stem which extends through said aperture, cutting means within said casing and adapted to be engaged by said valve, a handle adapter for attachment to the valve stem, a spring between said handle and said casing, whereby a predetermined pressure may be maintained between said valve and said cutting means, and screw means for regulating the pressure between said valve and said cutting means, said screw means further serving to center the valve in the casing, substantially as described.

2. A facing tool comprising the combination of a casing having an alining aperture therein, a removable cutter frame within said casing and having receiving slots therein, cutter knives within said slots, means for holding said cutter knives in position, means for rotating a valve placed within said casing and having its valve stem extending through said alining aperture, and means for regulating the pressure between said valve and said cutter knives, substantially as described.

3. A facing tool, comprising a casing having an aperture therethrough, an alining bushing within said aperture, said bushing adapted to receive a valve stem extending therethrough, cutting means within said casing and adapted to be engaged by a valve, means for rotating said valve and its valve stem, a bar fitted within and extending diametrically across said casing removably attached to said casing, and a screw having threaded engagement with the center of and passing through said bar, said screw adapted to engage said valve, whereby the valve is centered and the pressure between said valve and said cutting means may be varied, substantially as described.

REINHOLD GESSWEIN.

Witnesses:
HENRY M. HUXBY,
L. E. HANNEN.